United States Patent [19]

Bauer et al.

[11] Patent Number: 4,696,537
[45] Date of Patent: Sep. 29, 1987

[54] CONNECTOR FOR FIBER OPTIC CABLES

[75] Inventors: Anton E. Bauer, Neckarsulm; Gerhard Billmann, Bad Rappenau; Jörg Rathke, Untergruppenbach; Hans-Joachim Schimanek, Heilbronn; Georg W. Schrott, Heilbronn; Hans Wodok, Heilbronn, all of Fed. Rep. of Germany

[73] Assignee: Allied Corporation, Morris Township, Morris County, N.J.

[21] Appl. No.: 200,124

[22] Filed: Oct. 24, 1980

[30] Foreign Application Priority Data

Oct. 25, 1979 [DE] Fed. Rep. of Germany ....... 2943180

[51] Int. Cl.⁴ .............................................. G02B 6/36
[52] U.S. Cl. ............................. 350/96.20; 350/96.21
[58] Field of Search ............... 350/96.20, 96.21, 96.22, 350/96.23

[56] References Cited

U.S. PATENT DOCUMENTS

| Re. 31,515 | 2/1984 | Heidt | 350/96.21 |
| 4,168,109 | 9/1979 | Dumire | 350/96.20 X |
| 4,205,896 | 6/1980 | Borsuk | 350/96.21 |
| 4,268,115 | 5/1981 | Slemon et al. | 350/96.20 |
| 4,283,125 | 8/1981 | Borsuk | 350/96.20 |

FOREIGN PATENT DOCUMENTS

| 2619625 | 11/1976 | Fed. Rep. of Germany ... 350/96.20 |
| 0055451 | 5/1979 | Japan ............................. 350/96.20 |

Primary Examiner—William L. Sikes
Assistant Examiner—Akm E. Ullah
Attorney, Agent, or Firm—A. Jose Cortina; Roger H. Criss

[57] ABSTRACT

A fiber optic cable connector is disclosed which will prevent the filament from being dislocated from the polished front contacting surface of the connector although the filament tends to move relative to the cable jacket in lengthwise direction of the cable under temperature change or bending influences. The cable jacket is fastened in a rear part of the connector housing, and the filament is fastened to a front part of the connector housing. The fastening zones of the cable jacket and the filament are held in fixed spaced relationship in lengthwise direction of the cable, and a compensating space is defined therebetween for receiving a portion of the filament with substantial looseness or freedom of lateral movement.

20 Claims, 6 Drawing Figures

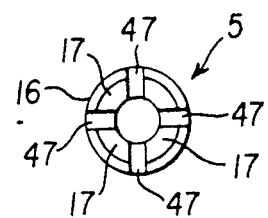
FIG. 2
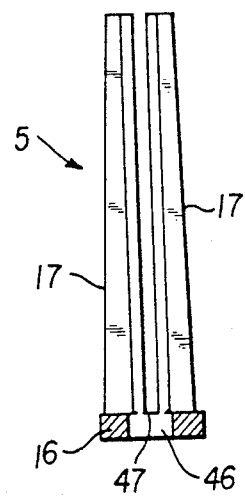
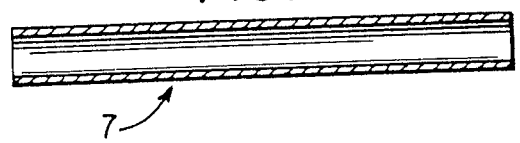
FIG. 3
FIG. 4
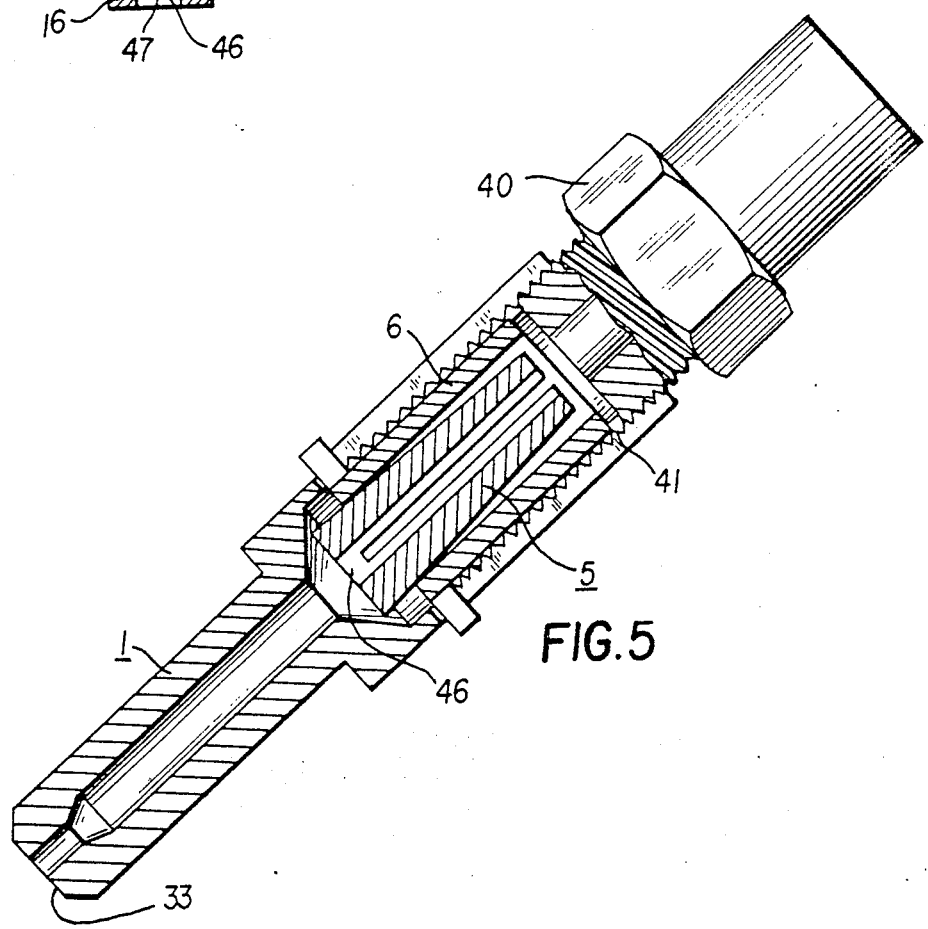
FIG. 5

CONNECTOR FOR FIBER OPTIC CABLES

BACKGROUND OF THE INVENTION

The invention generally relates to a connector for fiber optic cables, particularly to connectors for cables containing a fiber optic filament surrounded by an outer jacket and tending to move relative to the jacket in lengthwise direction under temperature or bending influences.

Due to movement of the filament in lengthwise direction within its surrounding jacket under temperature or bending influences, the position of the front end of the filament within the prior art connectors tends to change, and under these influences the filament front edge may either extend beyond the polished front face of the connector or retract with respect thereto. Under these circumstances, the prior art connector become at least ineffective if not inoperative.

OBJECTS OF THE INVENTION

It is a primary object of the invention to provide an improved fiber optic cable connector.

A further object of the invention is to provide an improved fiber optic cable connector in which the front edge of the filament is not subject to dislocation from the polished front contacting surface although the filament tends to move relative to the jacket of the cable in lengthwise direction thereof under temperature change or bending influences.

A still further object of the invention is to provide a fiber optic cable connector having a compensation space between a filament fastening zone at a front part of the connector housing and a jacket fastening zone at the rear part of the connector housing, the compensation space therebetween being of fixed length and receiving a portion of the filament with substantial looseness or freedom of lateral movement.

A still further object of the invention is to provide a fiber optic cable connector with an improved filament clamping device.

A still further object of the invention is to provide a fiber optic cable connector with an improved fastening of the filament within the bore of a front part of the connector housing by use of cementing.

SUMMARY OF THE INVENTION

In accordance with the invention, the fiber optic cable connector has a housing including a front part with a bore for receiving the filament and means for fastening the filament to the front part in a filament fastening zone; the housing further comprises a rear part with means for fastening the jacket of the cable thereto in a jacket fastening zone; further, the connector comprises means for holding the filament fastening zone in a fixed spaced relationship in lengthwise direction of the cable from the filament fastening zone, whereby a compensating space is defined between the two zones for receiving a portion of the filament with substantial looseness or freedom of lateral movement.

The looseness or freedom of lateral movement assures that even in case of major displacements of the filament in lengthwise direction within its jacket the front edge of the filament will not be subject to dislocation from the polished front contacting surface of the connector.

Further objects and features of the invention will stand out from the following description of non-limitative embodiments of the invention with reference to the accompanying drawings.

BRIEF DESCRIPTION OF THE DRAWINGS

FIG. 2 is a sectional view of a clamping collet of a preferred embodiment of the invention;

FIG. 3 is an end view of the clamping collet shown in FIG. 2;

FIG. 4 is a sectional view of a bushing being one of the fastening members shown in FIG. 1, prior to a crimping operation; and FIG. 5 is a cross-sectional view of a further embodiment of the inventive connector.

DETAILED DISCUSSION OF THE INVENTION

Figure 1:
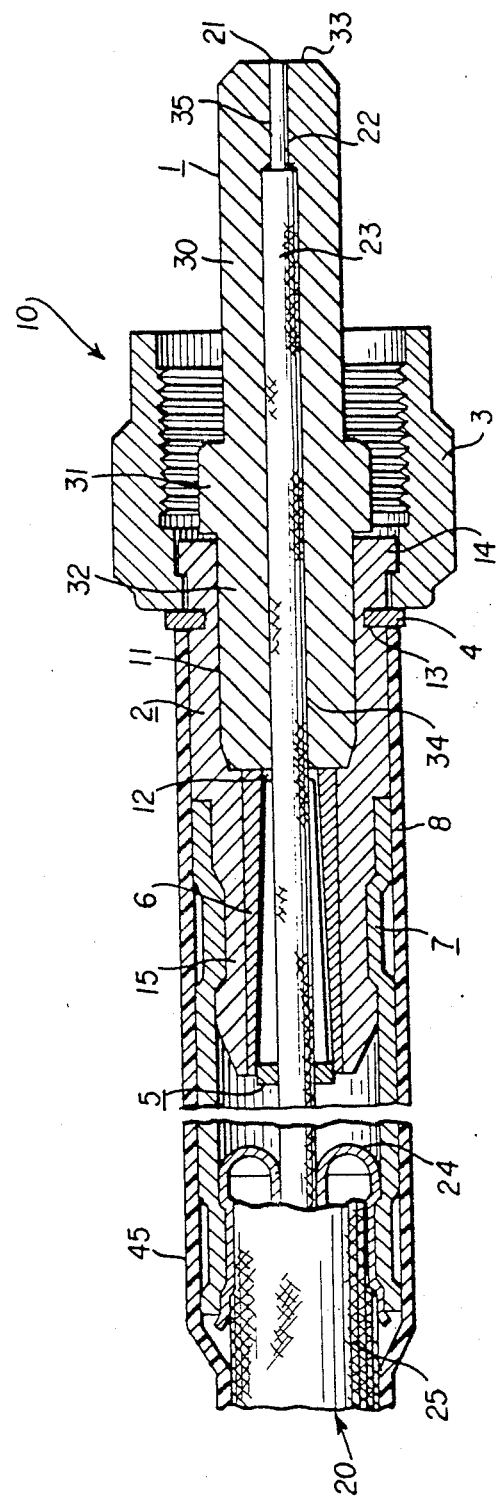
FIG. 1 is a longitudinal cross-sectional view of a first embodiment of the inventive connector.

Referring to the drawings, FIG. 1 shows a fiber optic cable connector 10 in cross-section into which a fiber optic cable 20 is introduced. The fiber optic cable 20 has a fiber optic filament 21 surrounded by a silicone coating 22, a fluorine plastic casing 23, a tension braid 24 and an outer jacket 25. The connector 10 comprises a housing having a front portion 1 with a bore 35 extending from a polished planar front surface 33, the diameter of the bore being somewhat smaller than the outer diameter of the silicone coating 22. The bore 35 is continued by another bore 34 the diameter of which corresponds with the outer diameter of the fluorine plastic casing 23. The filament 21 and the surrounding silicone coating 22 is forcibly engaged into the bore 35, and in the zone of the bore 34, the fluorine plastic casing 23 is cemented within the bore 37. The front part 1 of the housing is substantially of cylindrical shape, a plug portion 30 being followed by an abutment portion 31 of larger diameter with a intermediate diameter zone 32 therebetween.

A rear part 2 of the plug connector body receives the front part 1 within a bore 11, the diameter of which corresponds to the portion 32 inserted into the rear part 2. The bore 11 is continued in lengthwise direction of the rear part 2 by a bore 12 of reduced diameter corresponding to the outer diameter of a tightening sleeve 6 to be discussed later. The rear part 2 is provided with an outer recess 13 for receiving a retaining ring 4. A sleeve nut 3 for connection with a complementary female connector (not shown) is retained by the retaining ring 4 and an end collar 14 of increased diameter on the rear part 2. The front part 1, the rear part, the retaining ring 4 and the sleeve nut 3 may be provided as a pre-assembled unit or separately assembled, the front part 1 being forcibly engaged within the rear part 2 of the connector body. Substantially within the bore 12, the rear part 2 has a cylindrical zone 15 having a reduced diameter corresponding to the diameter of a clamping collet 7 to be disclosed later, the cylindrical zone 15 being bevelled towards its free end. As already mentioned, the tightening sleeve 6 is inserted into the bore 12 of the rear part 2. Its peripheral surface is cylindrical, whereas its bore is tapered along its longitudinal axis. The tightening sleeve 6 has its reduced inner diameter directed towards the front part 1 and receives a clamping collet 5 therein. As shown in FIGS. 2 and 3, the clamping collet 5 is of truncated cone shape. In the direction of its longitudinal axis, the clamping collet 5 has a continued bore 46 the diameter of which corresponds to the outer diameter of the fluorine plastic casing 23. Further, in the longitudinal direction of the clamping collet, four elongated slots 47 are recessed at right angles with respect to each other to form four clamping members 17 with respect to bore 46, such clamping members 17 being connected with each other through an annular portion 16. The inclination angle of the peripheral surfaces of the clamping members 17, and thus of the clamping collet 5 corresponds to the one of the bore of the tightening sleeve 6. In this way, the clamping collet 5 in connection with the tightening sleeve 6 provides a conical clamping connection.

FIG. 4 shows a longitudinal cross-section of an elongated crimping bushing 7 made of malleable material and being substantially longer than the front part 1 of the connector, the bushing being shown prior to the crimping operation. The crimping bushing 7 is of substantially cylindrical shape and has an inner diameter corresponding substantially to the outer diameter of the zone 15 of the rear part 2.

Figure 1A:
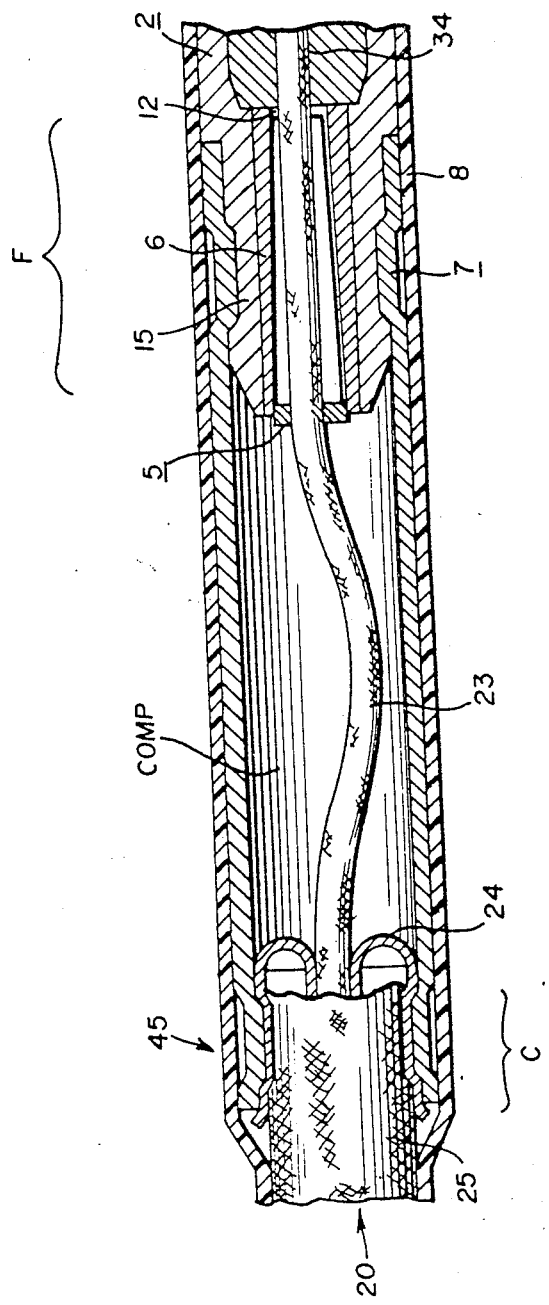
FIG. 1A is a similar sectional view showing a slacking portion of the filament not shown in FIG. 1.

In FIG. 1, an intermediate section of the rear part 2 of the connector has been omitted. The omitted portion is shown in FIG. 1A. As shown in this figure, between the fastening zone C of the cable and the clamping zone F of the filament 23, a compensation zone COMP is provided wherein the filament 23 shows a substantial slacking or looseness or freedom of lateral movement with respect to those fastening zones. Even in case of substantial displacement of the filament 23 within its jacket subject to bending or temperature changes, this looseness or freedom of the filament 23 will prevent the front edge thereof from being dislocated from the bore 35 wherein it is received.

To introduce the fiber optic cable 20 into the connector, the cable 20 is first prepared by removing portions of the jacket and casing to fit into the front part 1, the rear part 2 and the crimping bushing 7. The tension braid 24 is folded back over the jacket 25. Then, a shrinkage sleeve 8 and the crimping bushing 7 are pushed over the folded-back braid 24 and the clamping collet 5 and the tightening sleeve 6 over the casing 23 of the taped cable 20. Then, the taped cable 20 or filament 23 is introduced through the rear part 2 into which the front part 1 is forcibly engaged and which supports the retaining ring 4 and the sleeve nut 3. The fiber optic filament 21 and the silicone coating 22 are fastened within the bore 35 by forcing engagement and cementing the fluorine plastic casing 23 within the bore 34. Roughening of the fluorine plastic casing 23 will permit excellent bonding, e.g. when cyanoacrylate adhesive is used. Then, the tightening sleeve 6 is introduced to the bore 12 of the rear part 2, and through engagement of the clamping collet 5 within the tightening sleeve 6, the filament 23 is fixed through its casing within the zone of the bore 12. By pushing the clamping collet 5 into the tightening sleeve 6, a thus formed clamping cone will generate a clamping pressure substantially normally to the longitudinal axis of the clamping collet to compress the same to some extent, thereby fastening the filament casing 23, as the tightening sleeve 6 will at the same time be blocked within the bore 12 of the rear part 2. This action may be enhanced by applying an adhesive on the clamping collet and the tightening sleeve. Now, the crimping bushing 7 is pushed at one of its ends over the zone 15 of the rear part 2, whereas its other end is pushed over the jacket 25, the folded-back tension braid 24 being engaged therebetween. In this case, too, additionally, an adhesive may be applied. Then, the crimping bushing is crimped onto the zone 15 and onto the folded-back portion of the tension braid 24, as indicated by reference numeral 45. Through this crimping operation, as shown in FIG. 1, the cylindrical portion 15 of the front part 1 is deformed. Finally, the shrinkage sleeve 8 is pushed over the crimping zone and shrunk by heating.

The spaced fastening zones C and F and the elongated crimping bushing therebetween allow substantial looseness or freedom of lateral movement of the filament and its coating and surrounding casing within the space defined by the bushing; thus, tension created by bending and temperature changes will be compensated for. Although the silicone coating 22 has a low coefficient of friction, the location of the filament within the front part of the connector, particularly within the polished front contacting surface 33, will thus be maintained. The disclosed improved fiber optic connector will further allow quick, simplified and reliable mounting of the cable within the connector and blocking of the filament in lengthwise direction. In contrast with completely poured-out connectors, a damaged connector may be re-used after replacement of the damaged portion.

In accordance with another embodiment, crimping bushing, clamping collet and tightening sleeve are modified in accordance with the cable having a number of envelopes deferring from the embodiment shown in the drawings.

FIG. 5 shows a further embodiment of the connector 10. The clamping collet 5 is formed in a manner similar to FIG. 2. The tightening sleeve 6, however, is cylindrical with respect to its outer as well as to its inner diameter. The front part 1 of the connector of this embodiment has a decreased diameter bore 41 in its zone directed away from the front surface 33, this bore 41 being provided with a thread into which the clamping collet 5 and the tightening sleeve may be engaged over the fiber optic cable. For fastening and tension-securing of the cable, a pressure bolt 40 having an outer thread corresponding to the one of the bore 41 is pushed over the cable and screwed in. In this way, the clamping collet 5 will be pushed through the tightening sleeve 6 in lengthwise direction and will block the fiber optic cable.

Investigations performed with connectors in accordance with the first embodiment, e.g. a cable of 3 meters length having been tempered at 100° C. for 24 hours, have shown that no dislocation of the filament with respect to the contacting front surface will occur although the cable is laid with as little as 30 millimeters of bending radius and in spite of an additional heat treatment at a temperature of 100° C. for 3 hours, and even in spite of twisting stresses.

What is claimed is:
1. A connector for a cable containing at least one fiber optic filament and having an outer jacket surrounding said filament, said filament tending to move relative to said jacket in lengthwise direction of said cable under at least one of temperature change and bending influences, said connector comprising a housing including a front part having a bore for receiving said filament and means for fastening said filament to said front part in a filament fastening zone, a rear part having means for fastening said jacket thereto in a jacket fastening zone, and means for holding said filament fastening zone in a fixed spaced relationship in lengthwise direction of said cable from said jacket fastening zone and defining a space therebetween for receiving a portion of said filament with substantial looseness to provide freedom of lateral movement to said filament.

2. The connector of claim 1, wherein said space is defined by a substantially tubular member extending in lengthwise direction of said cable and having a front end portion fastened to said front housing part in tension-proof manner and a rear end portion fastened to said jacket in tension-proof manner.

3. The connector of claim 2, wherein said front end portion is fastened to said front housing part by clamping or crimping.

4. The connector of claim 2, wherein said rear end portion is fastened to said jacket by clamping or crimping.

5. The connector of claim 1, wherein said means for fastening said filament to said front part includes a clamping collet for engaging said filament and a tightening sleeve surrounding said clamping collet.

6. The connector of claim 1, wherein said means for fastening said filament to said front part includes cementing at least one of said filament and a surrounding casing member within said bore.

7. The connector of claim 1, wherein said cable is of the type provided with a tension braid fastened to said rear housing part.

8. The connector of claim 7, wherein said tension braid comprises an end portion folded back over said jacket and clamped between said jacket and said means for fastening said jacket to said rear housing portion.

9. The connector of claim 1, wherein said filament is of the type provided with a silicone coating.

10. The connector of claim 9, wherein said silicone coating has a fluorine plastic casing.

11. The connector of claim 9, wherein said fluorine plastic casing is cemented within said bore.

12. The connector of claim 1, wherein said front housing member has a stepped bore including a reduced diameter bore end portion opening in a front end surface of said connector and a larger diameter bore portion aligned with said bore end portion said reduced diameter bore end portion being adapted to receive an end portion of said filament of a cable and said larger diameter bore portion being adapted to receive a casing surrounding said filament except at said filament end portion.

13. The connector of claim 12, wherein said filament is of the type provided with a resilient silicone coating whereby when received in said connector said filament is forcibly engaged in said reduced diameter bore end portion.

14. The connector of claim 1 further comprising a cable, containing at least one fiber optic filament, and having an outer jacket surrounding said filament, connected to said connector.

15. The connector of claim 14, wherein said cable is of the type provided with a tension braid fastened to said rear housing part.

16. The conector of claim 15, wherein said tension braid comprises an end portion folded back over said jacket and clamped between said jacket and said means for fastening said jacket to said rear housing portion.

17. The connector of claim 14, wherein said filament is of the type provided with a silicone coating.

18. The connector of claim 17, wherein said silicone coating has a fluorine plastic casing.

19. The connector of claim 17, wherein said fluorine plastic casing is cemented within said bore.

20. The conector of claim 19 wherein said cable is connected to said connector in a manner such that the filament terminates flush with the front end surface of said connector, and is fastened at said jacket at the rear part including said jacket fastening zone in a manner such that the cable is held substantially loosely in said defined space thereby permitting lateral movement of said filament, its coating and surrounding casing within said defined space.

* * * * *